United States Patent Office 3,780,199
Patented Dec. 18, 1973

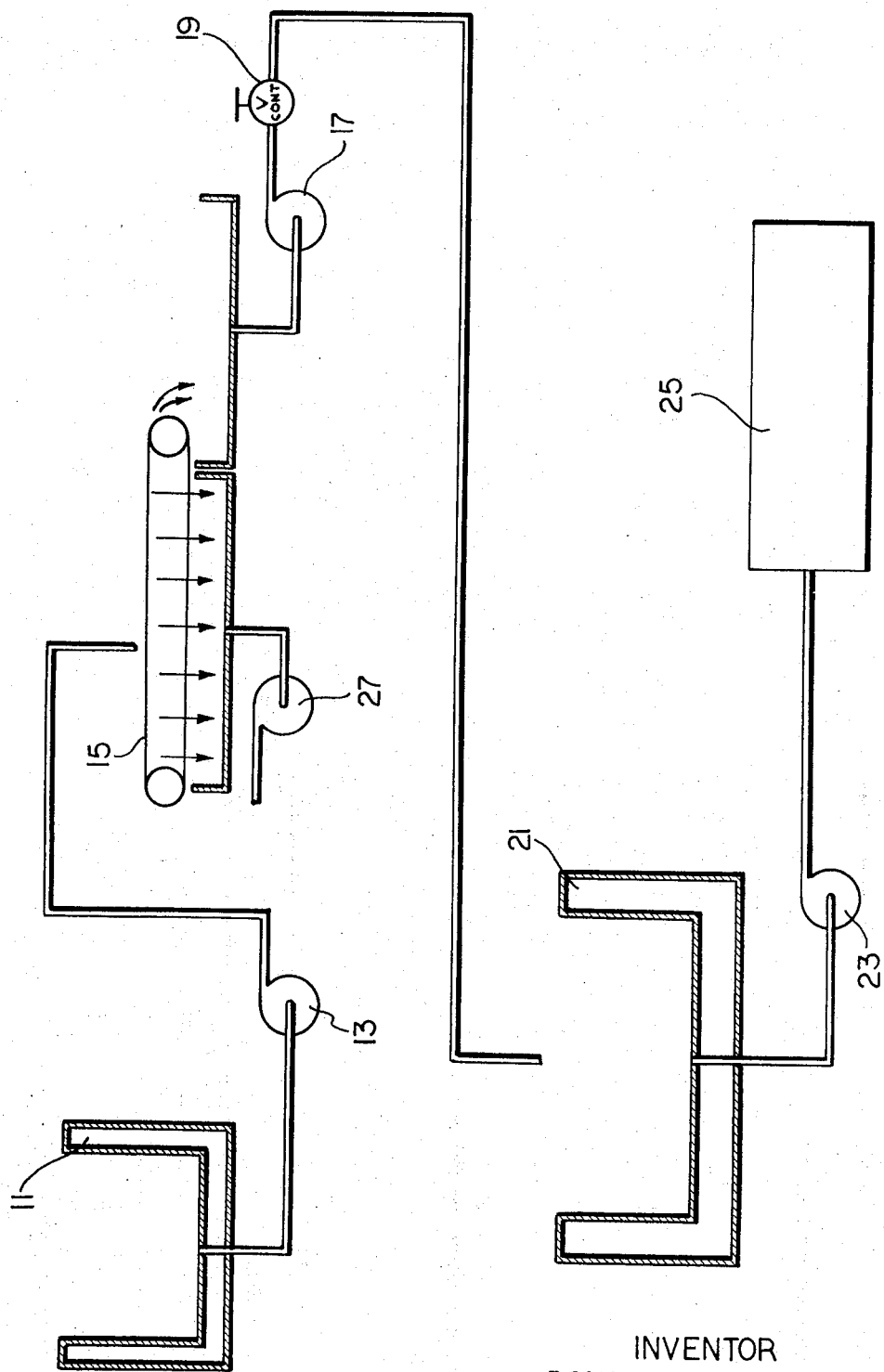

3,780,199
MANUFACTURE OF RICOTTA CHEESE
Donald R. Carswell, Lake Bluff, Ill., assignor to
Kraftco Corporation, New York, N.Y.
Filed Dec. 28, 1970, Ser. No. 101,611
Int. Cl. A23c 19/02
U.S. Cl. 426—495                4 Claims

ABSTRACT OF THE DISCLOSURE

An improved method for manufacture of Ricotta cheese is provided. In the method, Ricotta cheese curd and whey are pumped to a whey drainage screen having a particular mesh size. After whey has been drained from the curd, the curd is pumped against a predetermined back pressure to a holding tank. Thereafter, the curd is packaged into suitable containers while it is hot.

---

The present invention relates generally to an improved method and apparatus for the manufacture of Ricotta cheese. More particularly, the present invention relates to an improved method for making Ricotta cheese wherein the Ricotta cheese is packaged while hot.

Ricotta cheese is a well-known, distinctive type of cheese which is manufactured by a process which involves the use of high temperature cooking of the curd. High temperature heating used in the manufacture of Ricotta cheese provides curd with a characteristic cooked, caramel flavor. Ricotta cheese may be made from various milk and milk fractions and has often been manufactured from sweet whey produced in the manufacture of Swiss cheese or Cheddar cheese. In the United States, Ricotta cheese is most often made from whole cow's milk, and further discussion herein of methods of making Ricotta cheese will be made with respect to the manufacture of Ricotta cheese from whole cow's milk.

In making Ricotta cheese from whole milk, the whole milk is pumped into a jacketed kettle of a size such that a sufficient head space is present to compensate for expanded volume during heating. A lactic starter culture or other suitable acidulant is then added to the whole milk in the kettle to provide a Ricotta cheese mix. Other suitable acidulants include fermented whey, dried acid whey, acetic acid, citric acid and lactic acid. The lactic starter culture is prepared by growing a lactic acid producing microorganism in skim milk prior to the time when the lactic starter culture is required. Sufficient lactic starter culture is added to the whole milk to immediately produce a titratable acidity in the mix of about 0.30 percent. Thereafter, the mix is coagulated by heating the mix at a temperature of about 175° F. Heating is usually effected by direct steam injection into the mix. Salt and stabilizer are usually added during heating of the mix. After the mix has been heated and curd particles appear, the steam is turned off and the mix is allowed to remain quiescent for a period of about 10 minutes so that the curd particles become firm and coalesce on the surface. Steam is then applied to the jacket of the kettle, and the curd is gently pushed from the edges of the kettle towards the center with a spatula. Heating is usually continued for about 15 minutes and the curd is permitted to set for a few minutes. The curd is then ready for removal to suitable containers.

In known processes for making Ricotta cheese, the curd is removed from the kettle by dipping the curd from the kettle by hand with a shallow, perforated, stainless steel scoop. The curd is then placed into perforated containers which hold about 3 lbs. of curd. The containers are packed with curd until they are filled. The filled containers of curd are then placed into a sink and cold water is circulated around the containers for about 60 minutes so as to cool the curd. The containers are then lined up on a flat area and are covered with cheesecloth. Large quantities of crushed ice are then placed over the containers to thoroughly chill the curd and provide Ricotta cheese. After being stored overnight, the Ricotta cheese is ready for distribution. Ricotta cheese may be distributed in bulk, or may be emptied into mechanical fillers which repact the cheese in consumer sized packages.

It would be desirable to provide a more efficient and economical way to handle ricotta cheese curd after the curd has been produced. It would also be desirable to provide a method for making Ricotta cheese wherein the curd is packaged while hot. Hot packaging of the curd is desirable to provide Ricotta cheese which has an extended shelf life and which may be more easily distributed to the consumer.

Accordingly, it is a principal object of the present invention to provide an improved method and apparatus for making Ricotta cheese. It is another object of the invention to provide a method and apparatus for making Ricotta cheese wherein Ricotta cheese curd is packaged while hot. It is a further object of the present invention to provide an improved method and apparatus for handling Ricotta cheese curd.

These and other objects of the invention will become more apparent from the following detailed description and the accompanying drawing, wherein the single figure is a flow sheet of apparatus that may be used in the invention.

In general, in a method embodying various features of the invention, Ricotta cheese curd and whey is provided by any conventional process. The Ricotta cheese curd and whey are then pumped from the vat in which the curd and whey are prepared by means of a positive displacement pump to a whey drainage screen. The whey drainage screen has a particular mesh size. After whey has been drained from the curd by passing the curd over the whey drainage screen, the curd is pumped against a predetermined back pressure to a holding tank. Thereafter, the curd is packaged into suitable containers while it is hot.

More particularly, the method and apparatus of the invention will be described with reference to the drawing. In the drawing, Ricotta cheese curd is prepared by combining whole milk and a lactic acid producing starter culture or other acidulant in tank 11. Curd and whey are provided by heating the combination of milk and starter culture in tank 11 by steam injection. Thereafter, the curd and whey, while still hot, are pumped by a positive displacement pump 13 to a screen 15 where the curd is separated from the whey. After passing over the screen 15 the curd is pumped by positive displacement pump 17 through throttling valve 19 to storage tank 21. Storage tank 21 is provided with a jacket so that the curd may be maintained in a heated condition. The curd is then pumped from storage tank 21 by means of positive displacement pump 23 to packaging equipment 25. The whey, which is removed from the curd by means of the screen 15, is pumped by means of pump 27 to suitable disposal equipment (not shown).

The screen 15 may be any suitable screening apparatus with the desired characteristics. As indicated in the drawing, the screen may be in the form of a belt conveyor. Other suitable screening apparatus include vibratory screens and vibratory belt conveyors. The level of whey removal from the curd is controlled by the residence time of the curd and whey on the screen and the mesh size of screen. The screen mesh size is preferably from about 50 to about 400 mesh, Standard U.S. sieve size. This corresponds to a sieve opening of from about .0117 inch to about .0014 inch. The residence time of the curd on the screen should be from about 0.05 minute to about 0.75 minute. In general, the time of residence of the curd is proportioned to the screen mesh size so as to provide the curd with a desired level of moisture. It is desirable that the curd have less than about 80 percent moisture and the moisture may be reduced down to about 60 percent.

After the curd has been separated from the whey, the curd is pumped by means of positive displacement pump 17 against a back pressure created by valve 19 to the jacketed storage tank 21. To provide the proper curd characteristics with respect to texture, freedom from lumpiness and freedom from whey separation, the back pressure established by valve 19 should be from about 5 to about 100 p.s.i.g. If the back pressure is less than about 5 p.s.i.g., the curd tends to remain lumpy and is not attractive for commercial use. If the back pressure valve establishes a back pressure of more than about 100 p.s.i.g., the curd tends to become comminuted and the texture is undesirable.

After being pumped to the jacketed tank 21, the curd is held in the tank until required for packaging. The tank 21 is jacketed so that steam may be provided in the jacket to maintain the curd at an elevated temperature. In general, it is not desirable to hold the curd at an elevated temperature for a period longer than about two hours. The temperature maintained in the curd in tank 21 is from about 135° F. to about 180° F. At temperatures higher than the indicated range, an undesirable cooked flavor may be established in the curd. Temperatures lower than the indicated range may be maintained in the curd, however, such lower temperatures do not provide the advantages of the present invention with respect to extended shelf life. The curd is then pumped to packaging equipment and is packaged into suitable containers while at an elevated temperature.

The following example further illustrates various features of the invention, but is intended to in no way limit the scope of the invention, which is defined in the appended claims.

EXAMPLE

Ricotta cheese is made in accordance with the method of the invention, using the apparatus of the invention. A starter culture of *Streptococcus lactis* is established by adding an *S. lactis* culture to ferment for a period of about two days. The fermentation is continued until the acidity of the *S. lactis* starter culture is 1.0 percent. Thereafter, whole milk having 3.9 percent fat and an acidity of 0.15 percent is provided in the jacketed kettle 11. For each 5500 pounds of whole milk, 1500 pounds of the *S. lactis* starter culture is added to provide a Ricotta cheese mix having an acidity of 0.31 percent. The whole milk and the starter culture are thoroughly blended to provide the Ricotta cheese mix.

Thereafter, the Ricotta cheese mix is heated by direct steam injection to a temperature of 175° F. over a period of 35 minutes. The steam is then turned off and the Ricotta cheese mix, which is now in the process of coagulating, is allowed to remain quiescent for a period of 10 minutes. During the quiescent period, steam is applied to the jacket of the kettle. The steam is at a pressure of 15 p.s.i. so as to provide a temperature of 240° F. in the jacket. After the curd has been allowed to remain quiescent for 10 minutes, the curd is then gently moved from the walls of the kettle to the center for about 15 minutes. Thereafter, slow mechanical agitation is initiated.

The curd and whey are then pumped by means of pump 13 to a vibratory screen, identified as a Sweco model No. LS48588 vibratory screen having a diameter of 45 inches. The screen is provided with a 200-mesh screen, and the screen is adjusted so as to provide a curd residence time of .01 minute. The temperature of the curd at the time of screening is 180° F. The drained curd which is removed from the screen has a moisture content of 72 percent. The curd is then pumped by means of pump 17 through valve 19. Valve 19 is adjusted so as to establish a back pressure of 40 p.s.i.g. The curd is then pumped to tank 21. Tank 21 is equipped with a jacket and with means to gently agitate the curd as the curd is held in tank 21. Steam is applied to the jacket of tank 21 so as to maintain the temperature of the curd in the tank at 170° F. The curd is then pumped by means of pump 23 to packaging equipment 25, where the curd is filled into containers holding about one pound of curd. The curd at the time of packaging has a temperature of 160° F.

The packaged curd is then stored in a refrigerated room having a temperature of 40° F. to provide Ricotta cheese. The Ricotta cheese is stored over an extended period of time and is examined at periodic intervals. The Ricotta cheese produced by the method described above is stable, and does not show signs of wheying off or of losing its flavor for a period of two months. The method and apparatus of the present invention provide an improved method for making Ricotta cheese which is shelf stable for an extended period of time and which obviates many difficulties previously found in commercial methods for making Ricotta cheese.

Various features of the invention believed to be novel are set forth below in the appended claims.

I claim:

1. A method for the manufacture of Ricotta cheese consisting essentially of providing Ricotta cheese curd and whey, separating said curd from said whey by passing the curd and whey over a screen so as to drain said whey from said curd, transferring said curd and developing suitable curd characteristics by pumping said curd against a back pressure of from about 5 to about 100 p.s.i.g. through a conduit containing a valve which establishes said back pressure and thereafter packaging said curd while said curd is at an elevated temperature of from about 135° F. to about 180° F.

2. A method in accordance with claim 1 wherein said screen has a mesh size of from about 50 to about 400-mesh, Standard U.S. sieve size.

3. A method in accordance with claim 1 wherein the residence time of said curd on said screen is from about 0.05 minute to about 0.75 minute.

4. A method in accordance with claim 1 wherein said curd is maintained at an elevated temperature during said pumping.

References Cited

UNITED STATES PATENTS

| | | | |
|---|---|---|---|
| 3,072,489 | 1/1963 | Hurlburt et al. | 99—116 |
| 2,917,827 | 12/1959 | Lankford | 31—46 |
| 3,531,297 | 9/1970 | Kielsmeier et al. | 99—116 |
| 3,636,630 | 1/1972 | Budahn | 31—46 X |
| 2,980,538 | 4/1961 | Wolf | 99—116 |

FOREIGN PATENTS

| | | | |
|---|---|---|---|
| 1,188,046 | 4/1970 | Great Britain | 99—116 |

OTHER REFERENCES

Kosikowski, F., Cheese and Fermented Milk Foods, published by the author, Cornell University, N.Y., 1966. (pp. 123–125, 133, 134, 158–160 & 168–173.)

DAVID M. NAFF, Primary Examiner

U.S. Cl. X.R.

99—452